United States Patent [19]
Cox et al.

[11] Patent Number: 5,696,964
[45] Date of Patent: Dec. 9, 1997

[54] MULTIMEDIA DATABASE RETRIEVAL SYSTEM WHICH MAINTAINS A POSTERIOR PROBABILITY DISTRIBUTION THAT EACH ITEM IN THE DATABASE IS A TARGET OF A SEARCH

[75] Inventors: Ingemar J. Cox, Lawrenceville, N.J.; Matthew L. Miller, Vilnius, Lithuania; Stephen M. Omohundro, Monmouth Junction; Peter N. Yianilos, Princeton, both of N.J.

[73] Assignee: NEC Research Institute, Inc., Princeton, N.J.

[21] Appl. No.: 634,313

[22] Filed: Apr. 16, 1996

[51] Int. Cl.$^6$ ............................................. G06F 17/30
[52] U.S. Cl. .................... 395/605; 395/615; 395/326
[58] Field of Search ............................... 395/601, 602, 395/603, 604, 605, 615, 326, 968

[56] References Cited

U.S. PATENT DOCUMENTS 5,579,471  11/1996  Barber et al. ........................... 395/326

OTHER PUBLICATIONS

Ingemar J. Cox et al., "Target Testing and the Pic Hunter Bayesian Multimedia Retrieval System," Proc. of the 3d Forum on Research and Technology Advances in Digital Libraries, ADL '96, IEEE, pp. 66–75.

Ingemar J. Cox et al., "PicHunter: Bayesian Relevance Feedback for Image Retrieval," Proc. of the ICPR '96, IEEE, pp. 361–369.

"Jacob Methodology" @ http://WWCSAI.diepa.unipa.it/research/projects/jacob/jacob–method.html, date unknown.

Denis Lee et al., "Query by Image Content Using Multiple Objects and Multiple Features: User Interface Issues," 1994 Int'l Conf. on Image Processing, IEEE, pp. 76–80.

Atsushi Ono et al., "A Flexible Content-Based Image Retrieval System with Combined Scene Description Keyword," Proc. of Multimedia '96, IEEE, pp. 201–208.

P.M. Kelly, et al. "Candid Comparison Algorithm for Navigating Digital Image Databases", Proceedings 7$^{th}$ International Working Conference on Scientific and Statistical Database Management, pp. 252–258, 1994.

Barros, et al. "Indexing Multispectral Images for Content-Based Retrieval", Proc. 23$^{rd}$ AIPR Workshop on Image and Information Retrieval, Proc. 23$^{rd}$ Workshop, Washington, DC, Oct. 1994, pp. 25–36.

Flickner, et al. "Query by Image and Video Content, the QBIC System", IEEE Computer 28(9); 23–32, 1995.

Hirata, et al. "Query by Visual Example, Content Based Image Retrieval" Advance in Database Technology–EDBT '92, Springer–Verlag, Berlin 1992, pp. 56–71.

*Primary Examiner*—Paul V. Kulik
*Attorney, Agent, or Firm*—Jeffery J. Brosemer

[57] ABSTRACT

A queryless, multimedia database search method incorporating a Bayesian inference engine that refines its answer with each user response. The set of user responses includes of a series of displays and user actions, and is defined by a relatively simple user interface.

21 Claims, 10 Drawing Sheets

```
For each datum, I(i), in the database
   Initialize the probability of I(i), P(i), to 1/(size of database)
Let D = N randomly selected data from I
Display D
Get the user's response 'a'
While 'a' doesn't terminate the search
   For each datum, I(i), in D
      P(i) = 0 // We know that none of the data we just showed the user
              // is the one he's looking for.
   For each datum, I(i), in the database
      P(i) = P(i) * S( a, I(i), U )
   For each datum I(i) in the database
      P(i) = P(i) / sum(P)
   Let D = the N data with the highest probabilities
   Display D
   Get the user's response 'a'
```

Figure 1

```
S is the estimated probability being computed
D is the set of images
ai is 1 if the user selected D(i), 0 if not
I is the (hypothesized) target image
S = 1

If no images were selected
   S = 1
Else
   For each displayed image, D(i) in D
     V(f) = 0
     For each feature f in F
       For each D(j)in D, D(j) != D(i)
         If abs( f(I) - f(D(i)) ) < abs( f(I) - f(D(j)) )
           Vf = Vf + Wf
         Else if abs( f(I) - f(D(i)) ) == abs( f(I) - f(D(j)) )
           Vf = Vf + .5 * Wf
     P = 1. / (1 + exp( (M - V(f)) / sigma ))
     If ai == 1
       S = S * P
     Else
       S = S * (1 - P)
```

Figure 5

INITIALIZATION:

```
Let tList[1]...tList[M] be a complete list of possible
  targets, sorted in decreasing order of probability
p = 0
i = 0
For j = 1 to K
{
  nextP = (j - 1) / (K - 1)
  While p + P{ tList[i] } < nextP
  {
    p = p + P{ tList[i] }
    i = i + 1
  }
  sample[j] = tList[i]
}
```

Figure 8

```
Let pAD[1]...pAD[R] = 0, where R is the number of
   possible actions
Let A[1]...A[R] be a complete list of possible actions
Hta = 0
For j = 1 to K
{
  For a = 1 to R
  {
    p = (1/K) * P{ A[a] | sample[j], D }
    If p > 0
    {
      pAD[a] = pAD[a] + p
      Hta = Hta - p * log p
    }
  }
}
Ha = 0
For a = 1 to R
{
  If pAD[a] > 0
  {
    Ha = Ha - pAD[a] * log pAD[a]
  }
}
I = (log K) + Ha - Hta
```

Figure 9

MULTIMEDIA DATABASE RETRIEVAL SYSTEM WHICH MAINTAINS A POSTERIOR PROBABILITY DISTRIBUTION THAT EACH ITEM IN THE DATABASE IS A TARGET OF A SEARCH

FIELD OF THE INVENTION

This invention pertains generally to the field of storage and retrieval of data within a database and in particular to a method for retrieving multimedia data contained within a database.

DESCRIPTION OF THE ART AND PROBLEM

Multimedia databases are databases that contain digital data of images, music, and video, and are finding ever-increasing uses in business and entertainment. The widespread use of multimedia databases, however, is intensifying the need to develop more effective ways of searching such databases.

By way of background, a database is a collection of related data. Oftentimes, the data in a database is structurally organized as tables, fields and records. Generally, each record in the database possesses a set of attributes and a user may wish to conduct a search of the database based upon a value of one or more of the attributes. For example, in a database of football statistics, one may desire to search for all quarterbacks who completed 100 or more passes in a single season, etc.

In conducting such a search, it is assumed that each record possesses several attributes and the user wants to search for records that possess certain values of certain attributes. The specification of which records are desired is called a query and is usually restricted to one of three types: a) A simple query which specifies a specific value for a specific attribute; e.g., THROWINGARM=LEFT; or THROWINGARM=RIGHT; b) a range which specifies a specific range of values for a specific attribute; e.g., WEIGHT<220 or 180<WEIGHT<220; and c) a BOOLEAN such as (THROWINGARM=LEFT) AND (HEIGHT>6') AND (COMPLETIONS >99)).

Unfortunately, such query-based methods do not solve the problem of searching a multimedia database. This is because (1) multimedia data is generally not annotated with textual attribute descriptions, and (2) the vocabulary needed to describe a user's query may not exist or at least not be known to the user. Consequently, the prior-art has shown an increasing interest in developing content-based multimedia retrieval, particularly for image databases. See, for example, P. M. Kelly and T. M. Canon, "Candid: Comparison Algorithm for Navigating Digital Image Databases", in Proceedings Seventh International Working Conference on Scientific and Statistical Database Management, pp. 252–258, 1994, and J.Barros, J.French, W.Martin, P.Kelly and J. M. White, "Indexing Multispectral Images for Content-Based Retrieval", in Proceedings of the 23rd AIPR Workshop on Image and Information Systems, Washington DC, Oct. 1994.

Most prior-art, content-based image retrieval systems use some form of query by visual example to facilitate retrieval of an image from the data base. With such a system, successive queries are drawn from a set of images retrieved by a previous search. This is a crude form of relevance feedback which unfortunately, exhibits no adaptation. Each retrieval of an image is in response only to a specific query and any or all previous retrieval history is ignored. In these prior-art systems, such as those shown by Flickner, et al. in an article entitled "Query by Image and Video Content: The QBIC System" which appeared in IEEE Computer, 28(9), pp 23–32, 1995 and an article by K. Hirata et al., entitled "Query By Visual Example, Content Based Image Retrieval", which appeared in Advances in Database Technology—EDBT '92, Springer-Verlag, Berlin, 1992. retrieval ability is determined entirely by a similarity metric employed. Typically, such similarity metrics are a weighted sum over a set of features, the weights often being determined manually by the user.

Prior-art, image retrieval methods and systems, and in particular, content-based image retrieval methods and systems, can exhibit high false positive false and negative retrieval rates that can lead to long delays in finding a desired image.

SUMMARY OF THE INVENTION

The above problem is solved and an advance is made over the prior art in accordance with the principles of the invention wherein a system and method, PicHunter, based on a general Bayesian framework utilizes relevance feedback to direct a search. The system maintains a posterior probability distribution that each image in a multimedia database is the target of the search. This distribution is used to select the next images to display to the user and solicits selections from the user pertaining to images displayed. The user's selections are then incorporated into the posterior distribution via a probabilistic user model. A methodology for building a user model from a database of user selections is described. A distinguishing characteristic of this framework is that while other relevance feedback methods refine the query, the method which is the subject of the present invention refines the answer.

BRIEF DESCRIPTION OF THE DRAWINGS

The teachings of the present invention can be readily understood by considering the following detailed description in conjunction with the accompanying drawings, in which:

FIG. 1 is a pseudo-code listing for a general Bayesian relevance feedback method;

FIG. 5 is a pseudo-code listing for a user model;

FIG. 8 is a pseudo-code listing for an initialization module;

FIG. 9 is a pseudo-code listing for a computation module; and

DETAILED DESCRIPTION

Figure 2:
FIG. 2 is a screen image of a representative user interface used in accordance with the teachings of the present invention.

A preferred embodiment of the invention will now be described while referring to the figures, several of which may be simultaneously referred to during the course of the following description.

Before thoroughly describing the content-based search method and apparatus which is the subject of the present invention, it is necessary to define several definitions. Specifically, at least three classes of search may be identified:

Target search A Target search is one in which a user tries to find a specific target image. For example, a art-history student might need to find a specific painting, or a graphic artist might look for a specific stock photo that he has seen before.

Category search A Category search is one in which a user seeks images from a general category such as: "a sunset", "a bird", "a specific kind of car", or "a picture of the Eiffel Tower". The category search is distinct from target search because it (the category search) places more emphasis on the semantic content of images and often requires subjective judgments.

Open-ended browsing Open-ended browsing is characterized by a user who has at best a vague idea of what he's looking for. Additionally, the user may repeatedly change his mind during the course of the search. As an example, an interior decorator might begin with one decorating scheme in mind, but end up with a different scheme after seeing images from a design database. The consummate user of an open-ended browsing system may have no problem in mind. He simply enjoys navigating through a database and reacting to what he encounters.

While each of the above three search classes is important to content-based search methods, it is nevertheless difficult to quantitatively define what correct behavior means for category searching and open-ended browsing. Therefore, it is necessary to focus on target searching, for which there are several clear metrics for search effectiveness. Two exemplary metrics are: 1) the total time required to find a target image and alternatively, 2) the total number of images examined until the target is found.

With these metrics in mind, one test of the effectiveness of an image-retrieval method and system is the average difficulty (over many trials) a user experiences in finding a single, randomly selected target image from within a large database. Those skilled in the art can readily appreciate that several variations of this test are possible. For example, a target image can be displayed on a computer monitor beside an image-retrieval interface for the duration of a search. Or the target image may be displayed for only a short time interval before the search begins and then the user must search for the remembered image. Alternatively, the target image may be distorted, e.g. a hardcopy with color distortion, from the true image present in the database. This latter procedure may be useful to determine which distortions/features are important for image retrieval. The difficulty the user experiences in finding a target image may be quantified in a variety of ways, i.e. the amount of time or number of user interactions required (i.e. mouse clicks, iterations of the search, keystrokes, etc.).

Now consider a case where a user is searching for a specific datum in a database by means of a series of display/action iterations. Specifically, let I denote the database. In the case of PicHunter, I is a set of images, but the basic framework developed here holds just as well for other types of data.

$I_t \in I$ be the datum being searched for.

U denote the user that is searching for the target $I_t$.

$D_k$ be the information displayed by the system during iteration k. In the case of PicHunter, this is a small set of images, however the framework still applies if additional information is displayed.

A denote the set of possible actions that the user can take in response to each display. This is defined by the user interface. It is assumed that A includes some actions that terminate the search.

$a_k \in A$ be the action taken in iteration k.

With these assumptions in mind, a question emerges, namely: "given a history of display/action pairs, what is the probability that a given datum, $I_i \in I$, is equal to the target $I_t$?" To find this probability, Bayes' rule is applied, expressed in terms of the probability that the user would take the given sequence of actions if the target were $I_i$:

$$P\{I_i | a_1 \ldots a_k, D_1 \ldots D_k, U\} \propto P\{I_i | D_1 \ldots D_k, U\} P\{a_1 \ldots a_k | I_i, D_1 \ldots D_k, U\} \quad (1)$$

It can be assumed that the probability of any given datum being the target is independent of who the user is or what the sequence of displays has been. Therefore, $P\{I_i | D_1 \ldots D_k, U\} = P\{I_i\}$ is simply the prior probability that $I_i$ was chosen as the target.

Next, assume that the user's action in each iteration depends only on the target and on the current display, i.e. it is independent of any of the previous iterations.

Making the above two assumptions, results in:

$$P\{I_i | a_1 \ldots a_k, D_1 \ldots D_k, U\} \propto P\{I_i\} \prod_k P\{a_k | I_i, D_k, U\} \quad (2)$$

From Equation (2) it follows that, after each iteration, the change in probability of a given datum being the target can be computed, if there exists a function for estimating the probability of each possible user action, and in particular:

$$P\{a_k | I_i, D_k, U\} = KS(a_k, I_i, D_k, U) \quad (3)$$

where K is an arbitrary constant. Such a function represents a model of user behavior that can be tested and tuned experimentally, outside the context of an information retrieval system.

Figure 10:
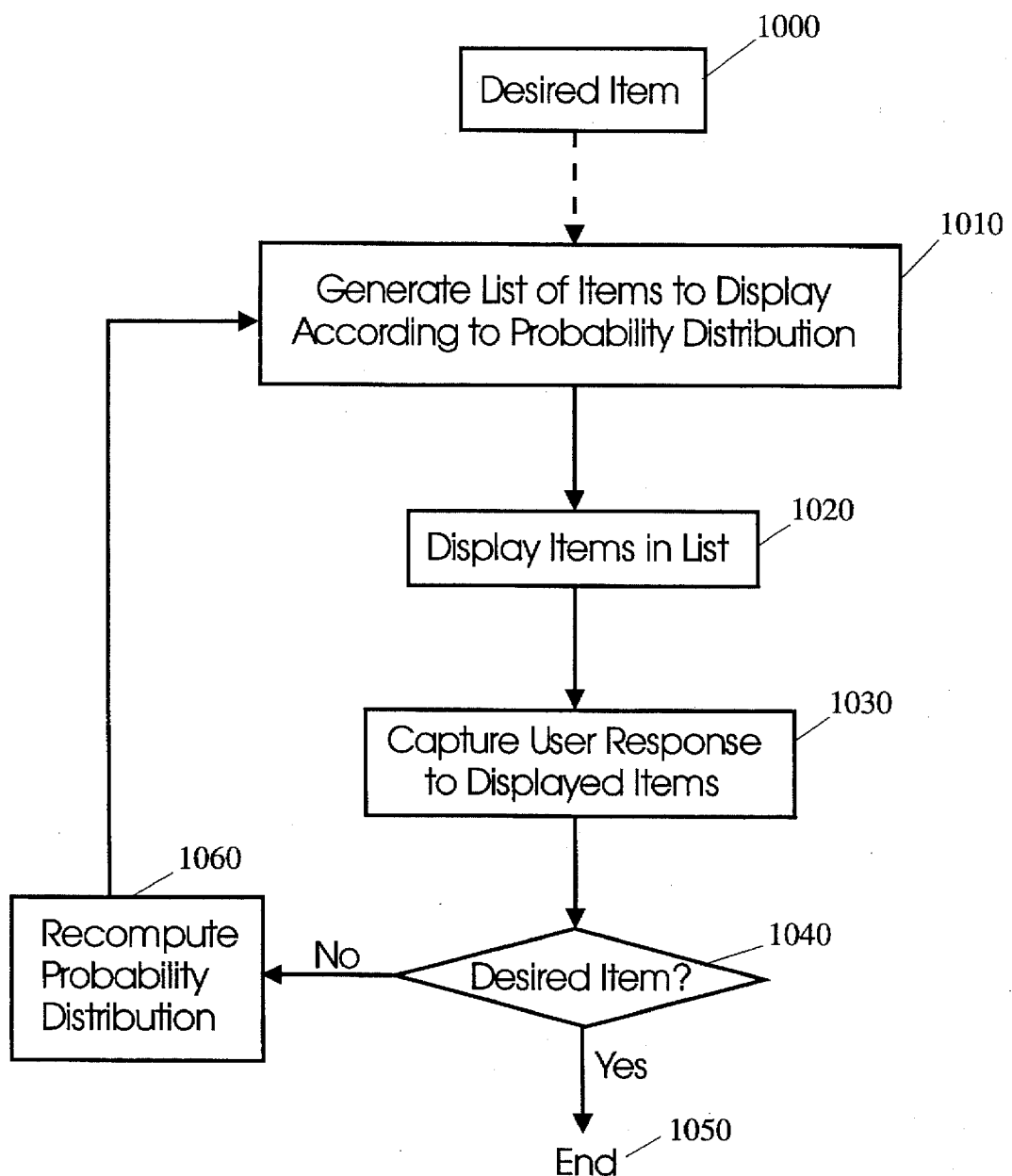
FIG. 10 is a flow diagram showing the steps performed when selecting an item for retrieval from a database according to the teachings of the present invention.

With reference to FIG. 10, there is shown a flowchart which depicts the processing during a database search/selection. Specifically, processing begins with desired item 1000. Normally the user of a database retrieval system will have a desired item in mind and can then search the database for items matching that desired item. Alternatively, and as taught by the present invention, a "target" desired item may be displayed to the user and the user then selectively finds an object which matches that target.

Processing proceeds at block 1010 by generating a list of items for display according to a set of rules, i.e., a probability distribution. In that instance where the list is generated according to a probability distribution, items are added to the list according to their probability of being closely associated with the desired item.

After the list of items is generated, the items are displayed to the user in block 1020. Subsequently, the user responds at block 1030 to the items displayed, by identifying which one(s) or none of the items are desired. If the desired item is displayed 1040, then the item is found and the processing ends 1050. Alternatively, block 1060 recomputes the probability distribution as a result of the user response and processing returns to block 1010.

FIG. 1 is a psuedocode listing for a relevance-feedback method built around a given user-behavior function, S. The method shown in FIG. 1 maintains the current distribution of probabilities that the data in the database are the target of the search. In each iteration of the search, the N most probable data are shown to a user, and the user's response is then used to update the probability distribution. Initially, the probability distribution is initialized with a flat prior distribution (consent value). Nevertheless, those skilled in the art can readily appreciate that the probability distribution might just as easily be initialized with a distribution computed from an explicit query, as when used in a query-based system.

The psuedocode listing shown in FIG. 1 is quite general. To instantiate the pseudocode in an actual program requires only that a set of possible actions, A, be defined by designing a user-interface and that a reasonable user model, S, be implemented.

With multimedia image retrieval systems such as that which is the subject of the present invention, it is desirable to keep the user interface as simple as possible, emphasizing the intelligent use of the information provided by the user. This approach contrasts sharply with approaches such as those advocated by M.Flickner, H. Sawhney, W. Niblack, J. Ashley, Q. Huang, B. Dom, M. Gorkani, J. Hafner, D. Lee, D. Petkovic, D. Steele, and P. Yanker in an article entitled, "Query by Image and Video Content: The QBIC System", which appeared in IEEE Computer, 28(9):23–32, 1995, in which the authors attempted to design a maximally informative user interface.

In contrast, the entire user interface of PicHunter is shown in FIG. 2. At any given time during a search, four images are displayed on thee screen and presented to a user. The user can select one or more of the displayed images by clicking on them with the mouse. Selected images are highlighted by red borders. Images may be deselected by clicking on them once again.

After selecting zero or more images, the user calls up the next set of four images by hitting the "GO" button. The user continues selecting images and hitting "GO" until the target appears. At this point, the search is terminated by selecting that image and hitting the "FOUND" button. The "ABORT" button terminates the search before the target image is found. The set, A, of possible user responses to the images displayed contains 20 elements. Sixteen (16) possible combinations of selected images, plus 4 possible terminations of the search.

Those skilled in the art can appreciate that the user interface may be enhanced with the addition of richer controls such as buttons that the user can press to independently indicate whether an image resembles the target's color, shape, texture, or composition. For example, the system could be implemented with a touch-screen and installed in a fabric store to help customers find fabric designs. Regardless of the particular user interface employed, the Bayesian framework employed here is applicable to any particular user interface.

To develop the user model, two simplifying assumptions are made. First, it is assumed that all users are identical, so U can be ignored. If not, then the approach could be applied to individual users or classes of similar users. Second, it is assumed that the user's behavior will be correlated with a small set of image feature values.

The set of features used in the present invention is finite, nevertheless, those skilled in the art can readily envision additional features at some future time. Table 1 describes the 18 features presently used. Note that Item #16, Contrast, has Y0 as a brightness

TABLE 1

Description of feature set.

| | |
|---|---|
| 1 | Image width as a fraction of the maximum width in the database |
| 2 | Image height as a fraction of the maximum height in the database |
| 3–13 | Percentages of pixels that fall into the following ranges of HSV colorspace. |
| | "black" - $V \leq 3\%$ |
| | "grey" - $S \leq 15\%$, $2\% \leq V \leq 85\%$ |
| | "white" - $S \leq 15\%$, $80\% \leq V$ |
| | "red" - $10\% \leq S$, $5\% \leq V$, $-70$ deg $\leq H \leq 25$ deg |
| | "orange" - $10\% \leq S$, $2\% \leq V$, $15$ deg $\leq H \leq 50$ deg |
| | "yellow" - $10\% \leq S$, $8\% \leq V$, $25$ deg $\leq H \leq 80$ deg |
| | "green" - $10\% \leq S$, $2\% \leq V$, $75$ deg $\leq H \leq 185$ deg |
| | "blue" - $2\% \leq S$, $2\% \leq V$, $175$ deg $\leq H \leq 260$ deg |
| | "purple" - $10\% \leq S$, $2\% \leq V$, $255$ deg $\leq H \leq 300$ deg |
| | "brown" - $5\% \leq S \leq 85\%$, $1\% \leq V \leq 40\%$, $-50$ deg $\leq H \leq 80$ deg |
| | "pink" - $10\% \leq S \leq 60\%$, $2\% \leq V$, $-70$ deg $\leq H \leq 25$ deg |
| 14 | Mean saturation |
| 15 | Median intensity |
| 16 | Contrast |
| 17 | Number of "edgels" in the image. |
| 18 | The same as feature 17, but thresholded at 10%. | value that one-third of the pixels are below and Y1 as a brightness value that two-thirds of the pixels are below. Additionally, Item #17, the number of edgels in the image, is computed by first converting the image to grey-scale then filtering it with a simple 3×3 Laplacian filter and then thresholding the result at 20%.

After computing the 18-element feature vectors for each image in the database, an informal experiment was performed to identify the relationship between features and user actions. In each iteration of the experiment the subject (user) was shown a display of four randomly-selected images alongside a single, randomly-selected "target" image. The subject was then asked to select the image from the display that was "closest overall" to the target image. If none seemed close at all, then the subject was allowed to leave all of the images unselected. If two or more images seemed equally close, the subject was allowed to select more than one of the images. Surprisingly, a very simple model corresponds with the results of this and subsequent experiments. This simple model is based on a number of highly simplifying assumptions:

1. That the probability of the user selecting a given image depends only on the feature values of the target image and of the other images currently displayed. It is independent of any other images selected.

2. That the user bases his decision on only one feature for each image, and that the chosen feature will often correspond to exactly one of the computed features.

3. That the probability of a user choosing a given feature is constant. The probability of each feature is denoted as $W_f$, and is referred to as the feature's weight.

4. That the probability of the user selecting an image is a linear function of the number of other displayed images that are farther from the target in the chosen feature.

Once these assumptions are made, the probability of a given image being selected is a linear function of:

$$V(D_i, I_t, D) + \sum_{f \in F} W_f \sum_{j \in D} \begin{cases} 1 & \text{if } |f(I_t) - f(D_i)| < |f(I_t) - f(D_j)| \\ .5 & \text{if } |f(I_t) - f(D_i)| = |f(I_t) - f(D_j)| \\ 0 & \text{if } |f(I_t) - f(D_i)| > |f(I_t) - f(D_j)| \end{cases} \quad (4)$$

where F is a set of real-valued functions corresponding to the computed features of the images. For simplicity, $V(D_i, I_t, D)$ is called the "image score" of image $D_i$.

Figure 3:
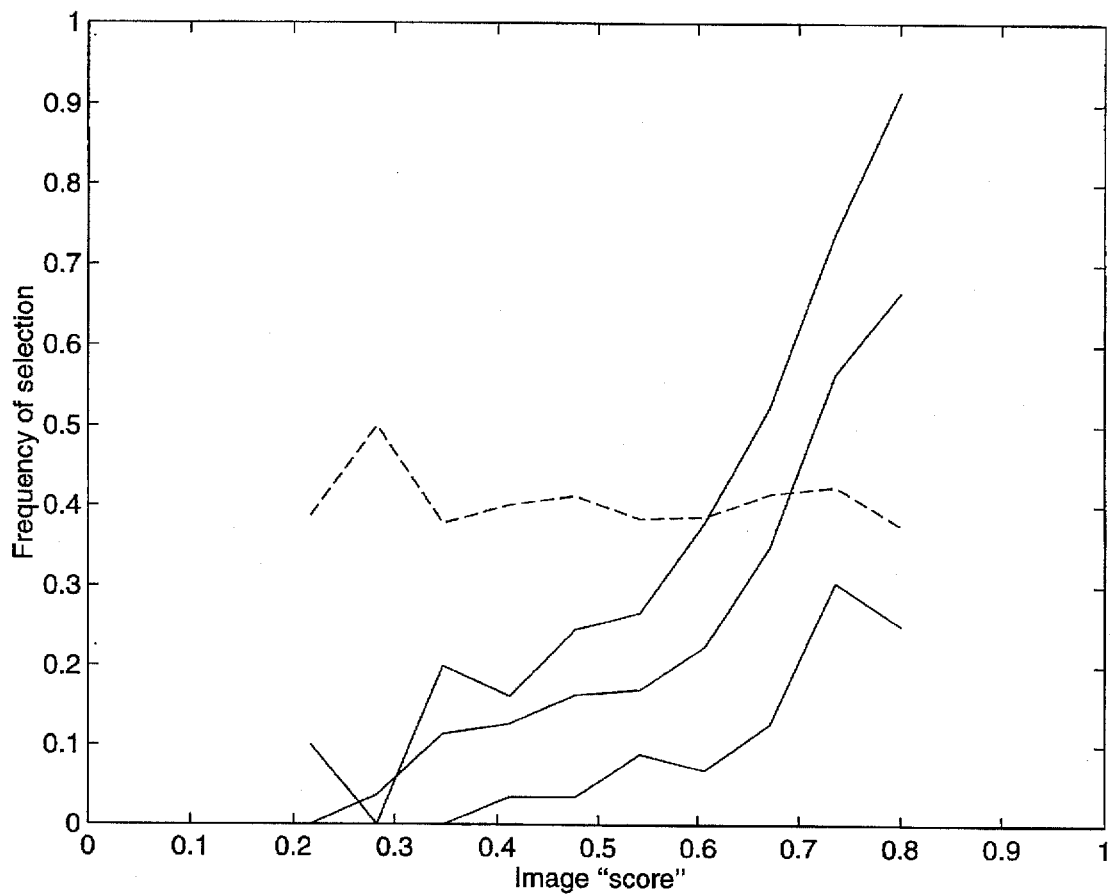
FIG. 3 is a graph showing frequency of image selection for 3 individuals.

FIG. 3 shows the relative frequency with which images were selected by three different subjects as a function of their image scores computed in this manner using the 18 features described in Table 1, and $W_f=1$. For comparison, the dotted line shows the performance of a purely random "user". FIG. 3 clearly illustrates correlation between image scores and frequency of selection.

The primary difference between the users is the frequency with which they selected no images at all. If all the trials in which no images were selected are ignored, then the performance of the three subjects is strikingly similar, as illustrated in FIG. 3. This suggests that subjects first decided whether or not any image should be selected at all, and that different subjects had different thresholds for this judgement. But, once the decision to select an image was made, the rest of the procedure is accurately modeled by Equation 4.

Using "image scores" and conceding that the model does not apply when no images are selected, the S function is computed according to the procedure whose pseudocode is shown in FIG. 5. When the user selects no images, this procedure returns a constant value, independent of its inputs, which will leave the probability distribution of the database unchanged. When the user selects one or more images, the procedure finds the probability of the user selecting each image according to its image score and returns the product of the probabilities of all selected images times the product of one minus the probabilities of all unselected images.

According to the simplifying assumptions, the probability of an image being selected should be a linear function of its score. However, such a function may place too much trust in the model. If a linear function of the image score were used, then extreme image scores would lead to probabilities that would have to be clipped at 0 or 1. Unfortunately, however, users make mistakes. Therefore, extreme probabilities could cause the correct target to be completely eliminated from the search. To avoid this a sigmoid is fit to the experimental data, which is nearly linear in the range of the data, but which never quite reaches extreme probabilities. The parameters of the sigmoid, M and σ, were set by hand to yield a reasonable fit to the data.

The only remaining task is to choose values for the 18 feature weights, $W_f$, such that they fit the experimental data reasonably well. To gather more data for this step, a version of PicHunter was implemented in which all weights were set to unity. A number of searches was then performed, and each user's actions were recorded. The measured performance of this version of PicHunter was only slightly worse than the performance of the optimized version.

Figure 4:
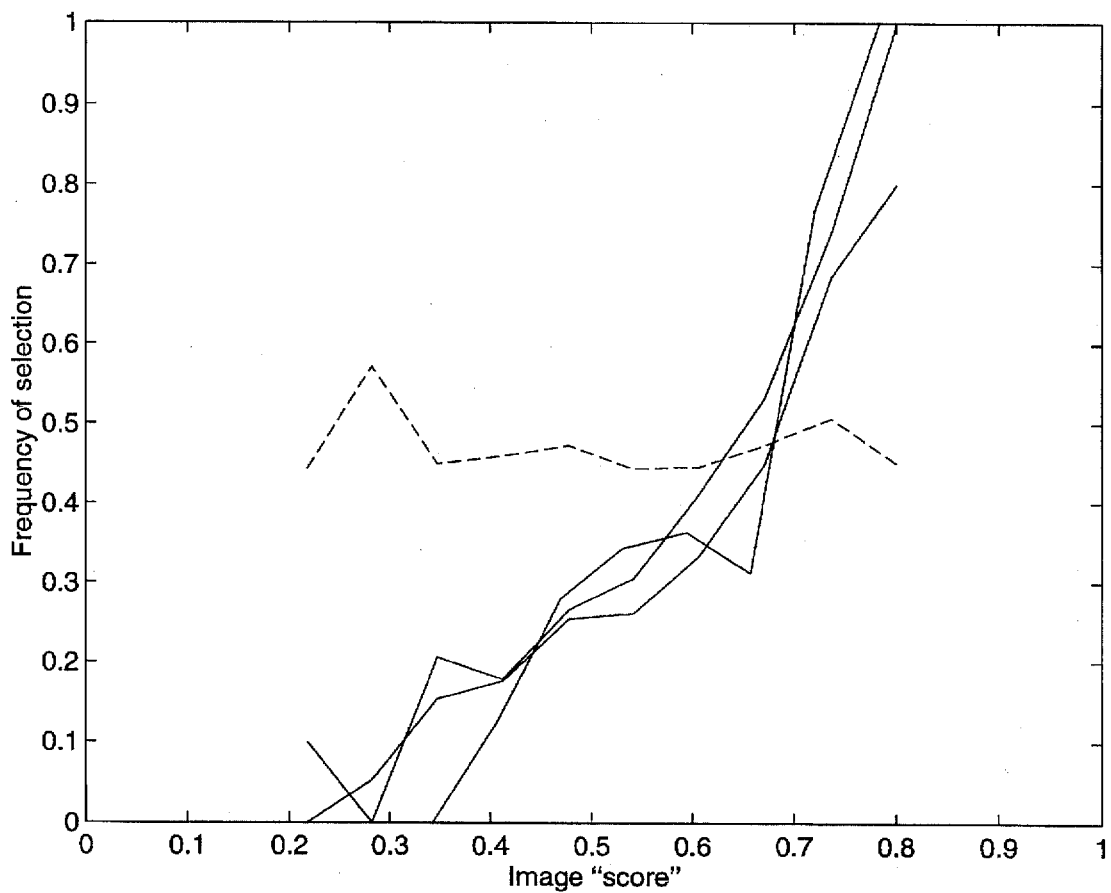
FIG. 4 is a graph showing frequency of image selection for 3 individuals when no image selections are ignored.

After verifying that users' behavior during these searches matched the behavior shown in FIG. 4, this data was combined with the data collected initially.

Next, the correlation coefficients between the recorded selections and image scores computed with each of our 18 features alone was determined. The features were then sorted in decreasing order of correlation and the weight for the feature with the highest correlation was set to 1, while the weights for the other features were initialized to 0. A weight for each successive feature, in decreasing order of correlation, was identified by trying 100 weights between the values of 0 and 2, and choosing the one which gave the overall best correlation with our data, as shown in Table 2.

TABLE 2

| Feature weights | |
|---|---|
| $W_1$ | 0.0223 |
| $W_2$ | 0.1362 |

TABLE 2-continued

| Feature weights | |
|---|---|
| $W_3$ | 0.0469 |
| $W_4$ | 0.0290 |
| $W_5$ | 0.0290 |
| $W_6$ | 0.0848 |
| $W_7$ | 0.0625 |
| $W_8$ | 0.0201 |
| $W_9$ | 0.0603 |
| $W_{10}$ | 0.1116 |
| $W_{11}$ | 0.0647 |
| $W_{12}$ | 0.0335 |
| $W_{13}$ | 0.0112 |
| $W_{14}$ | 0.0893 |
| $W_{15}$ | 0.0826 |
| $W_{16}$ | 0.0491 |
| $W_{17}$ | 0.0134 |
| $W_{18}$ | 0.0536 |

To test PicHunter, a commercial database of over 20,000 stock images on 201 Compact Disk's (CD's) was acquired. Four thousand, five hundred, twenty-two (4522) of the images were transferred to a hard disk at a resolution of 128×192 pixels and the 18 features contained in Table 1 were precomputed.

PicHunter was tested on this database by several subjects who conducted a number of searches. The first subject was one of the inventors of the present application and this first set of results represent the performance that can be achieved by a user with maximal expertise—that is: a user whose behavior is likely to match the S function. The second subject was a systems programmer who was uninvolved in the development of the system. This second set of results represent the performance of a computer expert who has no special expertise in the use of the system. Lastly, the system was briefly tested by eight other subjects, who performed just one or two searches each. This third set of results represent the performance of people with normal computer literacy and no knowledge of the system whatsoever.

TABLE 3

Test results for various subjects.

| | Expert User | Computer Expert | Computer Literates |
|---|---|---|---|
| Number of Searches | 20 | 24 | 11 |
| Number of targets found | 20 | 19 | 6 |
| Median search length | 22 | 65 | 234 |
| Mean successful search length | 53 | 57 | 75 |
| Standard dev. of successful searches | 78 | 40 | 86 |

Each of the testers was given only a minimal amount of instructions consisting only of the following:

1. Select the image that's most similar to the target by clicking on it. A selected image has a red border.
2. If you can't decide between two or more images, you can select more than one.
3. If none of the images looks at all close to the target or if all of them look equally close, don't select any of them.
4. If you change your mind about which image(s) is (are) closest, you can deselect images by clicking on them again.
5. Once you've selected the best image(s), click on the "GO" button to get the next set of images.
6. When the target image appears, select it and then hit the "FOUND" button.

Figure 6:
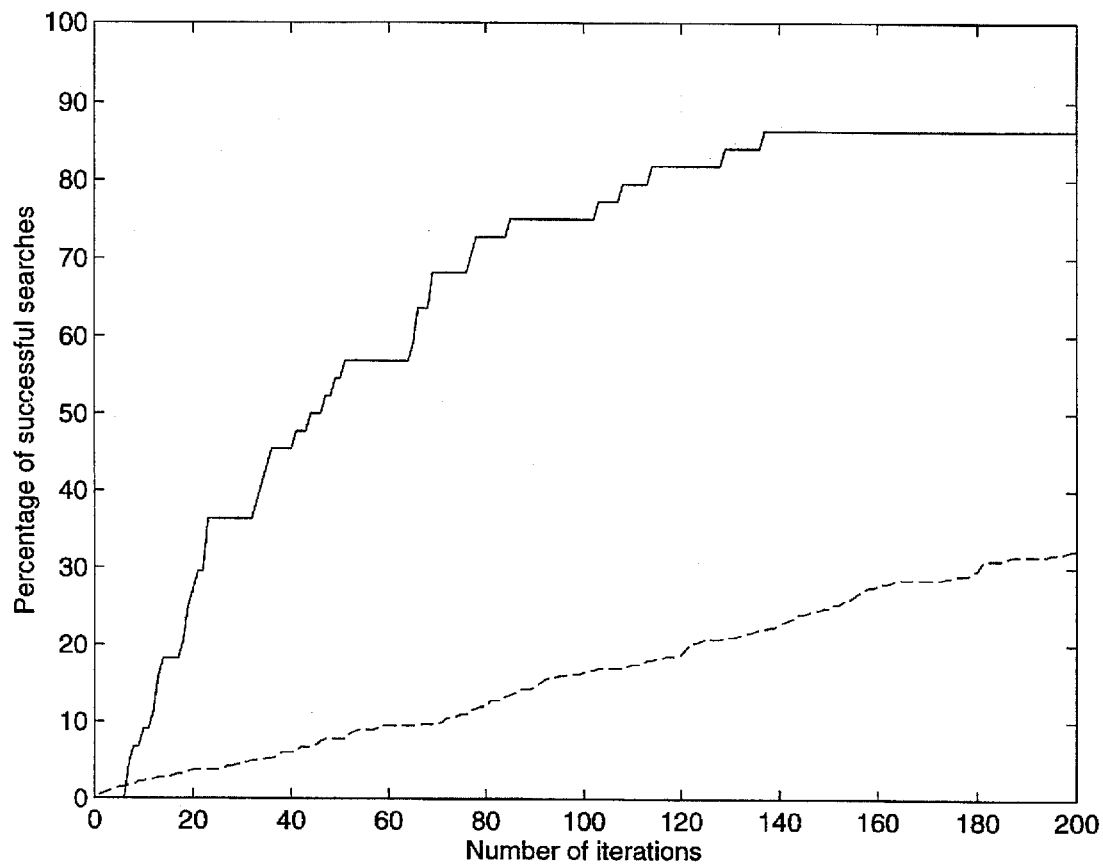
FIG. 6 is a graph showing the percentage of successful searches as a function of search length.
Figure 7A:
FIGS. 7a–7d show screen images of four iterations of a single search.
Figure 7B:
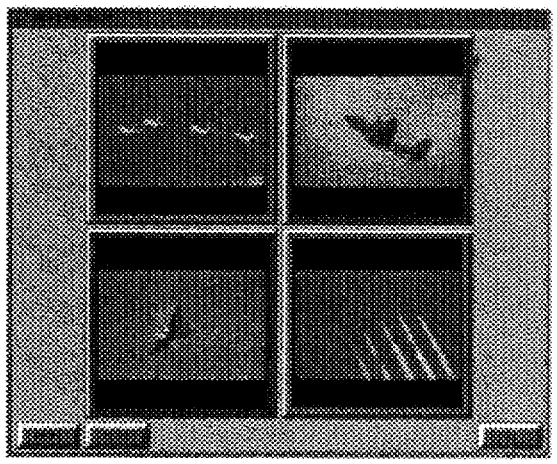
Figure 7C:
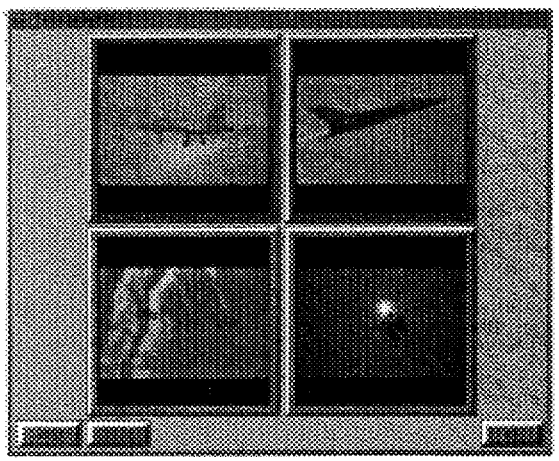
Figure 7D:
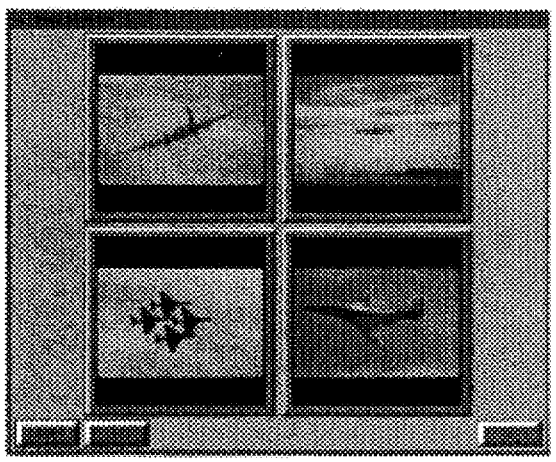

Of course, these instructions are highly uninformative and alternative instructions would include hints about how best to work with the system. The results of all the tests are shown in Table 3. FIG. 6 graphs the results for the two computer experts, showing the percentage of searches that were completed successfully within a given number of iterations. The dotted line indicates the corresponding percentages that would be expected if the database was searched at random.

The results from the two computer experts clearly show that the system is a substantial improvement over random search in spite of the simplicity of the user interface and precomputed image features. On average, images were successfully found after just over 55 iterations, or 220 images viewed out of 4522. The simplicity of the user interface makes it possible for an experienced user to spend just one or two seconds on each iteration, so an average search lasts only a few minutes.

The results from third set were not as good. Only half of their searches were successful and the mean length of a successful search was 75 iterations. Nevertheless, this is significantly better than random chance.

One possible reason for the difficulty encountered by the third group of users is that this group often focused on features which the system does not measure. For example, one such user, who was searching for a picture of a flamingo, reported that she was basing her selections on whether images contained curves matching the curve of the flamingo's neck. Inasmuch as the present feature set contains no measure of curvature whatsoever, it is not surprising then that the image was not found. A more comprehensive feature set will likely improve the performance for such novice users.

As stated previously, the current user interface was chosen to be as simple as possible. Specifically, the system displays a set of images (currently 4) and the user selects a subset of them by clicking on them with with a selection device, i.e., a mouse. While this interface is readily understandable by a user, it provides the search engine with rather impoverished information about the user's desires. More complex interfaces which allow the user to provide the engine more precise information are easily imagined.

For example, a simple extension to the current interface would allow a user to indicate the strength with which a displayed image matches his goals. Additionally, mechanisms that allow the user to indicate the features on which a match occurs would likely prove useful. A more complex enhancement to the user interface would allow the user to selectively identify those portions of a presented image which are particularly relevant. The user could simply click on the relevant image regions or could "lasso" them with the mouse. Such an enhancement would allow the user to be quite specific while not requiring him to learn a complex query language or drawing tool.

It is desirable to choose displays that maximize the expected reduction in entropy which will result from Bayesian update of the database probability distribution. This is equivalent to maximizing the mutual information between user actions and target images. By way of example, if T is the target image, drawn from a distribution that's been determined by the search up to the present moment, and A is the user's action, drawn from the distribution determined by the prediction algorithm, then it is desirable to find the D which maximizes:

$$-\sum_T P\{T\}\log P\{T\} + -\sum_A P\{A|D\} \log P\{A|D\} -$$

$$-\sum_{T,A} P\{T,A|D\} \log P\{T, A|D\}$$

For a given display, the mutual information may be computed between actions and target images in $O(M \times S_N)$ time, where M is the number of images in the database, and $S_N$ is the complexity of estimating the probabilities of user actions on a display of N images.

It is important to use all possible user actions in the calculation of mutual information, including actions that terminate the search. If the target image is one of the images in the display, then the user has a 100% chance of taking the corresponding termination action and a 0% chance of doing anything else. The effect of this is that Bayesian update after a termination action reduces the entropy to 0 and the mutual information resulting from a given display reflects the probability that the display contains the target image.

Unfortunately, a brute-force approach to finding the display which gives the highest mutual information would be $O(M \times S_N \times (M \text{ choose } N))$. As such, even when M and N are trivially small, a brute-force approach is prohibitive.

To reduce the $O(M \text{ choose } N)$ part, a 'greedy' heuristic is used. First, the best single image to display is chosen. This will simply be the one that has the highest probability of being the target. Next, the particular one image that will provide the most informative 2-image display is added. Note that this step requires $O(M \times M \times S_2)$ computation, since it is necessary to compute mutual information given each of the images in the database. Repeating N times to get N images, then, takes $O((\sum_{i=1}^{N} S_i) \times M^2)$ amount of time. While this is far better, it is still prohibitive when M is large, as it will be in any database of real interest.

To get into a reasonable complexity range, some of the images may be ignored as possible candidates for display. At first glance, it would seem that the candidates for display should just be the C images with the highest probability of being the target, where C is some manageable constant. But the top C images are often quite similar to each other, and obtaining useful information requires display of one or two images with lower probabilities for the sake of comparison. Therefore the top $C_1$ images are used, plus $C_2$ images that are spaced evenly through the remaining list. Considering only these images for display gives a complexity of $O((\sum_{i=1}^{N} S_i) \times (C_1+C_2) \times M)$ This can be further improved by using an approximate method to estimate the mutual information. The method is divided into two stages: an initialization stage, of complexity $O(M \log M)$, and a computation stage, of complexity $O(K \times S_N)$, where K is a value chosen to yield acceptable precision. The initialization stage need be computed only once for a given distribution of T's. Then I(T; A|D) can be estimated for various possible D's without redoing the initialization.

With reference to FIG. 8, the method selects a set of K sample images. The probability that the target image is one of the images between two adjacent samples, sample[j] and sample[j+1], is 1/K ("between" here means between them in the sorted list tList). Note that an image whose probability is higher than 1/K may appear more than once on the list of samples.

In the computation stage shown in FIG. 9, it is assumed that the list of samples is a complete list of all the possible images, and each has a probability of 1/K.

Using this approximation of mutual information, and the heuristics described above, a set of images can be chosen for display in $O((\Sigma_{i=1}^{N}S_i)\times(C_1+C_2)\times K)$ amount of time. Since $C_1$, $C_2$, and K can be chosen to be much smaller than M, this is a significant improvement.

While the invention has been shown and described in detail in the context of a preferred embodiment, it will be apparent to those skilled in the art that variations and modifications are possible without departing from the broad principles and spirit of the invention. Specifically, while the invention has only been described with respect to searching image databases, virtually all of the concepts are relevant to other media. In particular, audio, video databases and 3-d models. Therefore, the invention of the present application should be limited solely by the scope of the claims appended hereto.

What is claimed is:

1. An interactive method for finding items in a database, said method comprising the steps of:

generating a list of N items according to a procedure based upon a probability distribution over the items in the database;

displaying said list of N items to a user;

capturing a user response to the displayed items through an interactive user-interface, wherein said response expresses a relation between the displayed items and an item being searched for;

recomputing the probability distribution over items in the database according to the user response; and repeating the above steps until the item being searched for is one of the N items displayed.

2. The method according to claim 1 wherein said generating step generates a list of N most probable items.

3. The method according to claim 1 wherein said generating step generates the lists of N items such that any mutual information between the user response and the item searched for is maximized.

4. The method according to claim 3 in which the list of N items to be displayed is chosen by:

(i) placing the highest probability item on the list;

(ii) using a subset of the items in the database, finding an item which when added to the list results in a combination having the highest estimated mutual information;

(iii) adding the item to the list; and repeating the above steps (ii)–(iii) until the list contains N items.

5. The method according to claim 3 wherein the method of estimating mutual information comprises the steps of:

initializing, in decreasing order of probability, a complete list of possible targets;

choosing from the list a set of sample targets having equally spaced probabilities; and computing the mutual information between the sample targets and the user response where each of the sample targets has equal prior probability.

6. The method according to claim 1 wherein said capturing step further includes the user responding to displayed items by identifying the items that are most similar to the item being searched for.

7. The method according to claim 1 wherein said capturing step further includes the user responding to the displayed items by indicating a degree of similarity between the displayed items and the item being searched for.

8. The method according to claim 1 wherein said capturing step further includes the user responding to displayed items by indicating aspects or components of the displayed items that are similar to the item being searched for.

9. The method according to claim 1 wherein said recomputing step includes computing a new probability distribution over items in the database from the user response according to Bayes' rule and an algorithmic model of the user wherein said algorithmic model computes a probability distribution over response, conditioned on items displayed and items being searched for.

10. The method according to claim 9 wherein: the algorithmic model of the user employs a set of precomputed features of the items in the database.

11. The method according to claim 9 wherein: the algorithmic model of the user employs a set of manually entered features of the items in the database.

12. The method according to claim 9 wherein: the algorithmic model of the user assigns an independent probability of the user identifying each displayed item as closest to the item being searched for, and computes the probability of any given combination of indications as the product of the probabilities of the indicated items times the product of one minus the non-indicated items.

13. The method according to claim 12 wherein: the probability of each displayed item being identified as closest to the item being searched for is computed as the product of the probabilities that the user will consider that displayed item to be closer than the other displayed items.

14. The method according to claim 10, wherein the database is a database of images and one of the precomputed features is a histogram of basic colors.

15. The method according to claim 1 wherein the database is a database of images.

16. The method according to claim 1 wherein the database is a database of sounds.

17. The method according to claim 1 wherein the database is a database of video clips.

18. The method according to claim 1 wherein the database is a database of 2d shapes.

19. The method according to claim 1 wherein the database is a database of 3d shapes.

20. The method according to claim 1 wherein the database is a database of text.

21. An interactive method for measuring the effectiveness of a database search, said method comprising the steps of:

generating a target object for which to be searched;

displaying said target object and a set of candidate objects to a user;

measuring the search effectiveness by evaluating one or more metrics of difficulty user has in finding the target; and repeating the above steps while averaging the measures of difficulty.

* * * * *